(12) United States Patent  
Stagi et al.

(10) Patent No.: US 7,331,806 B2
(45) Date of Patent: Feb. 19, 2008

(54) CABLE CONNECTORS WITH INTERNAL FLUID RESERVOIRS

(75) Inventors: William R. Stagi, Burien, WA (US); James Steele, Seattle, WA (US)

(73) Assignee: UTILX Corporation, Kent, WA (US)

( * ) Notice: Subject to any disclaimer, the term of this patent is extended or adjusted under 35 U.S.C. 154(b) by 0 days.

(21) Appl. No.: 10/978,913

(22) Filed: Nov. 1, 2004

(65) Prior Publication Data

US 2006/0046546 A1 Mar. 2, 2006

Related U.S. Application Data

(60) Provisional application No. 60/604,506, filed on Aug. 25, 2004.

(51) Int. Cl.
*H01R 4/60* (2006.01)

(52) U.S. Cl. ........................... 439/204; 439/181

(58) Field of Classification Search ........ 439/181–187, 439/190, 191, 198, 199–205, 912, 921
See application file for complete search history.

(56) References Cited

U.S. PATENT DOCUMENTS

| 1,172,322 | A | 2/1916 | Torchio |
| 1,846,361 | A | 2/1932 | Saylor |
| 2,248,588 | A | 7/1941 | Shanklin et al. |
| 3,649,952 | A | 3/1972 | Harmon |
| 3,654,590 | A | 4/1972 | Brown |
| 3,791,406 | A | 2/1974 | Philipps |
| 3,883,208 | A | 5/1975 | Sankey et al. |
| 4,077,494 | A | 3/1978 | Spaude et al. |
| 4,202,591 | A | 5/1980 | Borgstrom |
| 4,545,133 | A | 10/1985 | Fryszczyn et al. |
| 4,669,792 | A | 6/1987 | Kjeldstad |
| 4,888,886 | A | 12/1989 | Eager, Jr. et al. |
| 4,909,320 | A | 3/1990 | Hebert et al. |

(Continued)

FOREIGN PATENT DOCUMENTS

DE 1059527 6/1959

(Continued)

OTHER PUBLICATIONS

Eager, Jr., G.S., et al., "Extending Service Life of Installed 15-35 KV Extruded Dielectric Cables," *IEEE Transaction on Power Apparatus and Systems*, PAS-103(8): 1997-2005, Aug. 1984.

*Primary Examiner*—Khiem Nguyen
(74) *Attorney, Agent, or Firm*—Christensen O'Connor Johnson Kindness PLLC

(57) ABSTRACT

Cable terminations, junctions, or connectors having a cable affixed therein are provided, which include an internal cavity that is capable of (1) holding a selected volume of remediation fluid and (2) supplying it to the cable. Several embodiments of the cavity are capable of holding the remediation fluid under pressure for prolonged periods of time and through various environmental conditions such as temperature, moisture and sun exposure. Several embodiments of the internal cavity are divided into two or more chambers that are in physical communication through the opposition of pressure but which are chemically isolated. In several embodiments, an actuation device, such as a spring or compressed gas, pressurizes the fluid. Throughout the embodiments, individual access port(s) provide controlled access to the various internal chambers.

26 Claims, 14 Drawing Sheets

U.S. PATENT DOCUMENTS

| | | |
|---|---|---|
| 4,946,393 A | 8/1990 | Borgstrom et al. |
| 5,082,449 A | 1/1992 | Borgstrom et al. |
| 5,215,475 A | 6/1993 | Stevens |
| 5,573,410 A | 11/1996 | Stepniak |
| 5,846,093 A | 12/1998 | Muench et al. |
| 5,857,862 A | 1/1999 | Muench et al. |
| 5,907,128 A | 5/1999 | Lanan et al. |
| 6,332,785 B1 | 12/2001 | Muench, Jr. et al. |
| 6,338,637 B1 | 1/2002 | Muench, Jr. et al. |
| 6,489,554 B1 | 12/2002 | Bertini et al. |
| 6,517,366 B2 | 2/2003 | Bertini et al. |
| 6,811,418 B2 | 11/2004 | Jazowski et al. |
| 6,843,685 B1 | 1/2005 | Borgstrom et al. |

FOREIGN PATENT DOCUMENTS

| | | |
|---|---|---|
| DE | 19743608 A1 | 6/1998 |
| WO | WO 01/28059 A1 | 4/2001 |

CABLE CONNECTORS WITH INTERNAL FLUID RESERVOIRS

CROSS-REFERENCE TO RELATED APPLICATION

This application claims the benefit of U.S. Provisional Application No. 60/604,506, filed Aug. 25, 2004, the disclosure of which is hereby expressly incorporated by reference.

FIELD OF THE INVENTION

The present invention relates to a remediation process for the insulation of power cables, and more particularly, to cable terminations and connectors that contain and supply remediation fluid to the power cables.

BACKGROUND OF THE INVENTION

One remediation process for the insulation of medium and high voltage power cables requires the injection of a remediation fluid into the free spaces of a cable's conductor. In many instances, the injection process takes place while the cables are energized. When the remediation process is performed on energized cables, a class of special injection terminations may be used. Injection terminations are similar to industry standard cable terminations except that they are sealed to the environment and have special access ports designed to allow for the injection of fluid into the cable.

Currently, remediation fluid is stored in an external fluid feed tank and supplied to a cable through an injection termination. The fluid feed tank is generally housed in a switchgear cabinet or vault and the remediation fluid is supplied to the injection termination through the fluid-feed line. Some cables require more remediation fluid than what can be held initially in the free space of the conductor. In these instances, fluid feed tanks are left connected to the injection termination for extended periods of time to provide supplemental fluid. After the necessary amount of remediation fluid has been absorbed into the cable, the fluid feed tanks are removed from the cable system and the cable terminations are prepared for normal use.

Removing the fluid feed tank from the cable system and preparing the injection termination for permanent use is time consuming and difficult to coordinate from an operations standpoint. A cable termination constructed in accordance with the various embodiments of the present invention allows for a more time efficient remediation process.

SUMMARY OF THE INVENTION

In accordance with aspects of the present invention, a cable connector is provided for introducing fluid to a cable affixed in a primary chamber internal to the cable connector. The cable connector includes an injection port exposed to at least one exterior surface of the cable connector. The injection port is connected in fluid communication with the primary chamber internal to the cable connector. The cable connector further includes an auxiliary chamber internal to the cable connector. The auxiliary chamber is connected in fluid communication with the primary chamber.

In accordance with another aspect of the present invention, a cable connector is provided for introducing fluid to a cable affixed in a first chamber internal to the cable connector. The cable connector includes an injection port exposed to at least one exterior surface of the cable connector. The injection port is connected in fluid communication with the first chamber internal to the cable connector for supplying fluid thereto. The cable connector also includes a second chamber internal to the cable connector. The second chamber is connected in fluid communication with the first chamber. The cable connector further includes means for driving fluid disposed in the first chamber into the cable affixed therein.

In accordance with another aspect of the present invention, a cable connector is provided for introducing fluid to a cable affixed in a first chamber internal to the cable connector. The cable connector includes an injection port exposed to at least one external surface of the cable connector. The injection port is connected in fluid communication with the first chamber internal to the cable connector. The cable connector further includes a second discrete fluid chamber having a variable volume. The second chamber is connected in fluid communication with the first chamber.

In accordance with another aspect of the present invention, a cable connector is provided for introducing fluid to a cable affixed in a first chamber internal to the cable connector. The cable connector includes an injection port exposed to at least one exterior surface of the cable connector. The injection port is connected in fluid communication with the first chamber internal to the cable connector for supplying fluid thereto. The cable connector further includes means for driving fluid disposed in the first chamber into the cable affixed therein.

In accordance with another aspect of the present invention, a cable connector is provided which includes a housing including a fluid chamber, a cable section disposed within the fluid chamber, and pressurized fluid disposed within the fluid chamber.

In accordance with another aspect of the present invention, a cable connector is provided for introducing fluid to a cable affixed in a first chamber internal to the cable connector. The cable connector includes a second chamber internal to the cable connector. The second chamber fluidly isolated from the primary chamber. the cable connector further includes a pressure generator disposed in the second chamber, wherein the pressure generator applies pressure against fluid occupying the first chamber.

In accordance with another aspect of the present invention, a method of introducing fluid to a cable affixed in a chamber defined by a cable connector is provided. The method includes injecting remediation fluid into the chamber, thereby filling at least a portion of the chamber with the remediation fluid, and applying pressure against the remediation fluid, thereby driving the remediation fluid into the cable.

In accordance with another aspect of the present invention, a method is provided for remediating a cable or cable section having a conductor core protected by an outer insulation layer within a connector. The method includes obtaining an electrical connector. The connector includes a first fluid chamber, a second fluid chamber connected in fluid communication with the first fluid chamber, and a cable inlet. The core is exposed at a portion of the cable or cable section and is introduced through the cable inlet, thereby disposing the core within the first fluid chamber. Remediation fluid is injected into the first fluid chamber and the remediation fluid is pressurized so as to drive the fluid into the core.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the drawings where like numerals correspond to like elements. Embodiments of the present invention are generally directed to cable terminations, junctions, or connectors that include an internal cavity that is capable of (1) holding a selected volume of remediation fluid and (2) supplying it to the cable. Several embodiments of the cavity are capable of holding the remediation fluid under pressure for prolonged periods of time and through various environmental conditions, such as temperature, moisture and sun exposure.

As will be described in detail below, several embodiments of the internal cavity are divided into two or more chambers that are in physical communication through the opposition of pressure but which are chemically isolated. One chamber is in contact with the cable and is used to store and supply the remediation fluid. In several embodiments, the second chamber contains an actuation device, such as a spring or compressed gas, that drives the fluid from the first chamber into the cable. A third chamber is possible in several embodiments, and could be separated from the second chamber by a regulating device that contains pressurized gas at an intermediate level. Throughout the embodiments, individual access port(s) provide controlled access to the various internal chambers.

While the preferred embodiment is to house the internal cavity inside of a load-break elbow, the concepts discussed herein could be applied to other insulated and or shielded cable terminations (e.g., dead-break and dead-front elbow-style connectors, straight-plug terminations) and un-insulated live-front style terminations. As set forth below, several non-limiting examples of live-front terminations are illustrated and described. Several other non-limiting examples of injection elbow terminations shown and described herein may also be used with correspondingly designed live front terminations. Accordingly, the following descriptions and illustrations herein should be considered illustrative in nature, and thus, not limiting the scope of the present invention, as claimed.

Figure 1:
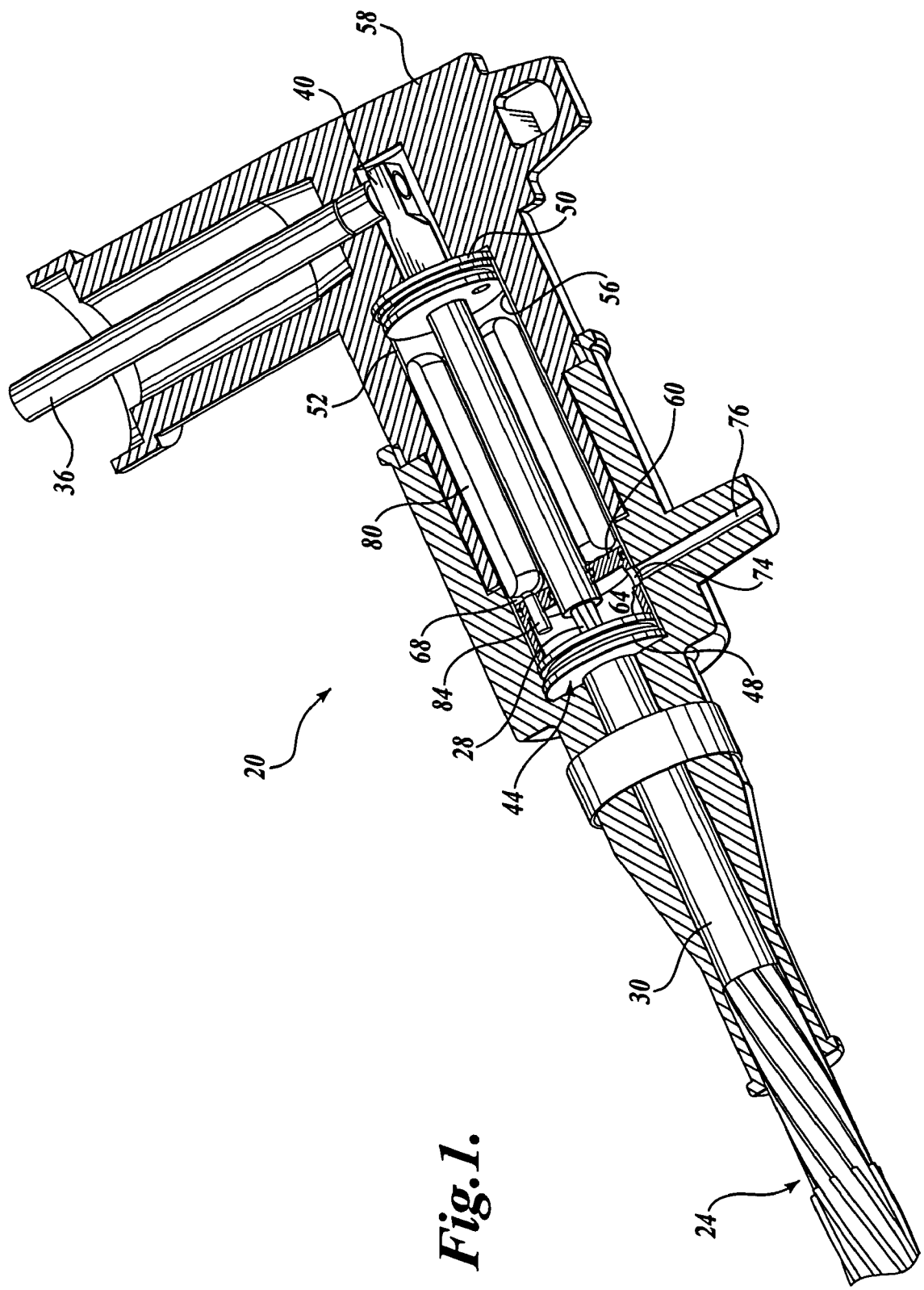
FIG. 1 is an isometric, partial cross-sectional view of a cable connector formed in accordance with one embodiment of the present invention.

Referring now to FIG. 1, one exemplary embodiment of an electrical connector 20 formed in accordance with aspects of the present application is shown. In one suitable use, the electrical connector 20 interconnects sources of energy, such as transformers and circuit breakers, to distribution systems and the like via an electrical cable or cable section 24. In one embodiment, the electrical cable or cable section 24 includes a conductive core 28 surrounded by an insulation layer 30. The conductive core 28 includes a plurality of electrically conductive stands, although a single strand may also be used. The electrical connector 20 typically interconnects one end of the electrical cable or cable section 24 to a probe 36 via a well known cable coupling 40.

The electrical connector 20 includes a canister 44, which is assembled from first and second end sections 48 and 50 and a main body section 52. While a cylindrical canister is shown, other shapes may be practiced with and are considered to be within the scope of the present invention. The canister 44, when assembled, defines an interior cavity 56, in which the cable coupling 40 is disposed. One end of the cable coupling 40 is conventionally connected to the conductive core 28 of the electrical cable or cable section 24, which is introduced into the interior cavity 56 through a cable access opening (not shown) defined by the first end section 48. The other end of the cable coupling 40 extends through the second end section 50 and is coupled in a conventional manner to the probe 36.

The canister 44 is suitably formed from well-known materials, such as engineered plastic or metal, that gives the connector 20 sufficient pressure holding capabilities. Seals (not shown) are positioned at the ends of the canister 44, in-between the end sections 48 and 50 and the main body section 52 of the canister 44, and at the interface between the canister 44 and the electrical cable or cable section 24. These seals are circumferential in style and can be o-rings, compression rings, gaskets, sealing threads or any other suitable seal capable of isolating the inner cavity 56 of the canister 44 from the environment. In the embodiment shown, the canister 44 is encased within an elbow-like outer housing 58.

Figure 2:
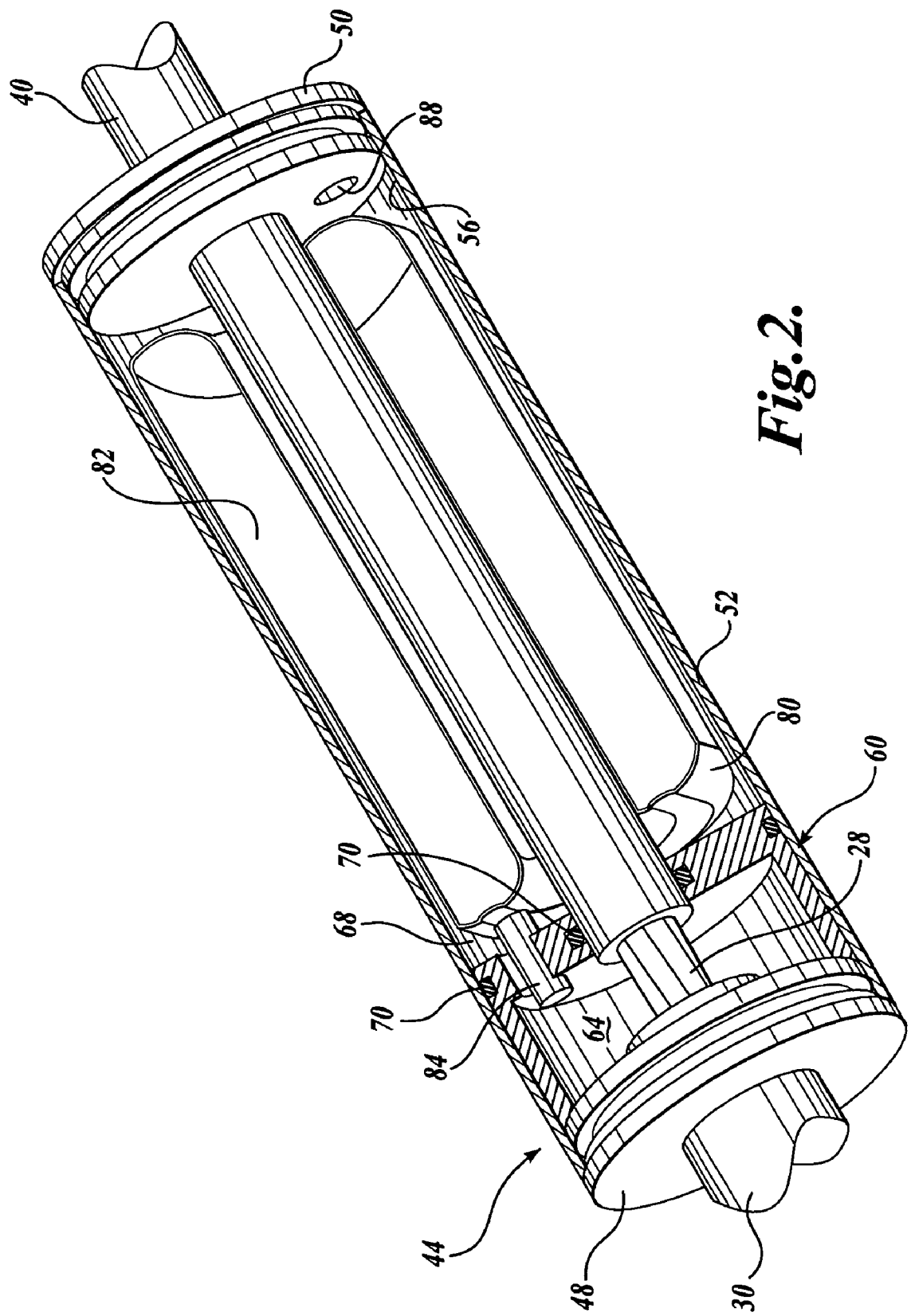
FIG. 2 is a magnified view of a canister of FIG. 1.

As best shown in FIG. 2, the electrical connector 20 further includes an open ended adapter 60, which seats within one end of the interior cavity and concentrically mounts over the cable coupling 40. The adapter 60 divides the interior cavity 56 into a first or primary chamber 64 and a second chamber 68. The first chamber 64 fluidly surrounds the exposed conductor core 28, and may be referred to hereinafter as the fluid chamber 64. Seals 70, similar in style to those discussed above, are positioned between the adapter 60 and canister wall and in-between the adapter 60 and the cable coupling 40 to isolate the fluid chamber 64 from the second chamber 68.

Returning to FIG. 1, the connector 20 further includes a fluid chamber access port 74 for providing entry to the fluid chamber 64 from the environment. In the embodiment shown, the fluid chamber access port 74 is formed in the side of the canister 52 and adapter 60 and is connected in fluid communication with a fluid passageway 76 defined by the outer housing 58. For several examples of accessing a fluid chamber that may be practiced with the present invention, please see U.S. Pat. Nos. 4,888,886; 4,946,393; 5,215,475; and 6,489,554, the disclosures of all are hereby expressly incorporated by reference. In use, remediation fluid, such as CABLECURE®, CABLECURE®/XL, CABLECURE®/SD, CABLECURE®/CB is injected into the fluid chamber 64 through the fluid chamber access port 74 and outer housing passageway 76. Such fluids are generally described in U.S. Pat. Nos. 4,766,011; 5,372,840; and 5,372,841, and are hereby incorporated by reference.

Referring to FIGS. 1 and 2, at least one bladder 80 is disposed within the second chamber 68. The bladder 80 is suitably constructed from a pliable material, and as such, defines a selective adjustable inner volume or cavity 82. The bladder 80 is suitably joined to the adapter 60 by a fluid passageway 84 so that the inner volume or cavity 82 of the bladder 80 is connected in fluid communication with the fluid chamber 64. As such, fluid injected into the fluid chamber 64 may further be introduced into the bladder 80.

In one embodiment, the remaining space within the second chamber 68 that surrounds the bladder 80 may be use to contain pressurized fluid for applying pressure against the bladder 80. As such, the remaining space may be referred to as an actuator chamber. An actuator chamber access port 88 may be disposed in the second end section 50 for controllably introducing a pressurized fluid, such as gas, into the actuator chamber. In several embodiments, pressures within the second chamber are contemplated to be approximately 3-10 psi. Although chamber pressures within the range of 3-10 psi are described in one embodiment, it should be apparent that the embodiments of the present invention are not intended to be so limited. As a non-limiting example, high chamber pressures are also within the scope of the present invention. Therefore, pressure ranges cited herein are intended to be non-limiting examples, and as such, a wide range of chamber pressures are within the scope of the present invention.

It will be appreciated that the actuator chamber access port 88 may be suitably fitted with a one way valve (not shown), as known in the art. In use, pressurized fluid introduced and stored within the actuator chamber exerts pressure on the bladder 80, the reason for which will be described in detail below.

It will be appreciated that the shape of the bladder 80 is determined by the amount of fluid it contains, the shape of the canister 44 and the pressure that is applied thereto. While the preferred embodiment utilizes compressed gas as the actuator, a polymeric bushing, compression spring or the like could be used to pressurize the remediation fluid contained in the bladder 80 by applying force against the bladder 80 or through an intermediary device, such as a piston, to more evenly distribute the force. Such an actuator would not require the actuator chamber access port.

In operation, remediation fluid is pumped or otherwise injected into the connector 20 through the outer housing passageway 76 and fluid chamber access port 74. As it passes through the access port 74, it fills the fluid chamber 64 defined by the adapter 60 and enters the electrical cable or cable section 24 by passing through the interstitial spaces between the strands of the exposed conductor core 28. The pumping process continues until a specified length of the electrical cable or cable section 24 is filled with the remediation fluid. After the specified length of the electrical cable or cable section 24 is filled, additional remediation fluid is pumped into the electrical connector 20 to fill the interior cavity 82 of the bladder 80. Doing so provides the bladder 80 with additional remediation fluid which, over a period of time, diffuses into the electrical cable 24 and aids in the proper restoration thereof. The inner cavity 82 of the bladder 82 may also be referred to as an auxiliary chamber.

To fill the bladder 80, remediation fluid is continued to be pumped into the fluid chamber 64 until it passes into the bladder 80 by passing through the fluid passageway 84. Remediation fluid is pumped into the fluid chamber 64 until sufficient volumes for treatment are achieved. At that point, the pumping process is complete and the fill apparatus is removed from fluid communication with the fluid chamber access port 74 and outer housing passageway 76. Although the operation is described as a sequence, it should be apparent that the invention is not intended to be so limited. In that regard, it is not necessary to the operation of the present invention that remediation fluid be pumped into the cable or cable section 24 and then into the bladder 80. Instead, the filling of both the cable or cable section 24 and bladder 80 may occur simultaneously. As a result, additional embodiments are also within the scope of the present invention.

Once the electrical connector 20 and cable 40 have been filled with remediation fluid, the remediation fluid begins to diffuse into the cable insulation. As fluid is depleted in the cable, it is replenished by the fluid remaining in the bladder inner chamber 82. Preferably, the electrical connector 20 is mounted during use such that the fluid chamber 64 is positioned below the bladder 80. In this case, the electrical connector 20 may use the effects of gravity to supply fluid from the bladder 80 to the fluid chamber 64 during use. In embodiments where the second chamber is pressurized, compressed gas may be selectively injected into the second chamber through the second chamber access port 88 prior to fluid injection.

During use, the pressurized fluid contained within the second chamber 68 applies pressure against the bladder 80, which in turn, applies pressure to the fluid occupying the fluid chamber 64. It will be appreciated that the pressure exerted against the bladder 80 aids in driving the fluid from the bladder 80 into the fluid chamber 64, and aids in driving the fluid into the cable or cable section 24.

Figure 3:
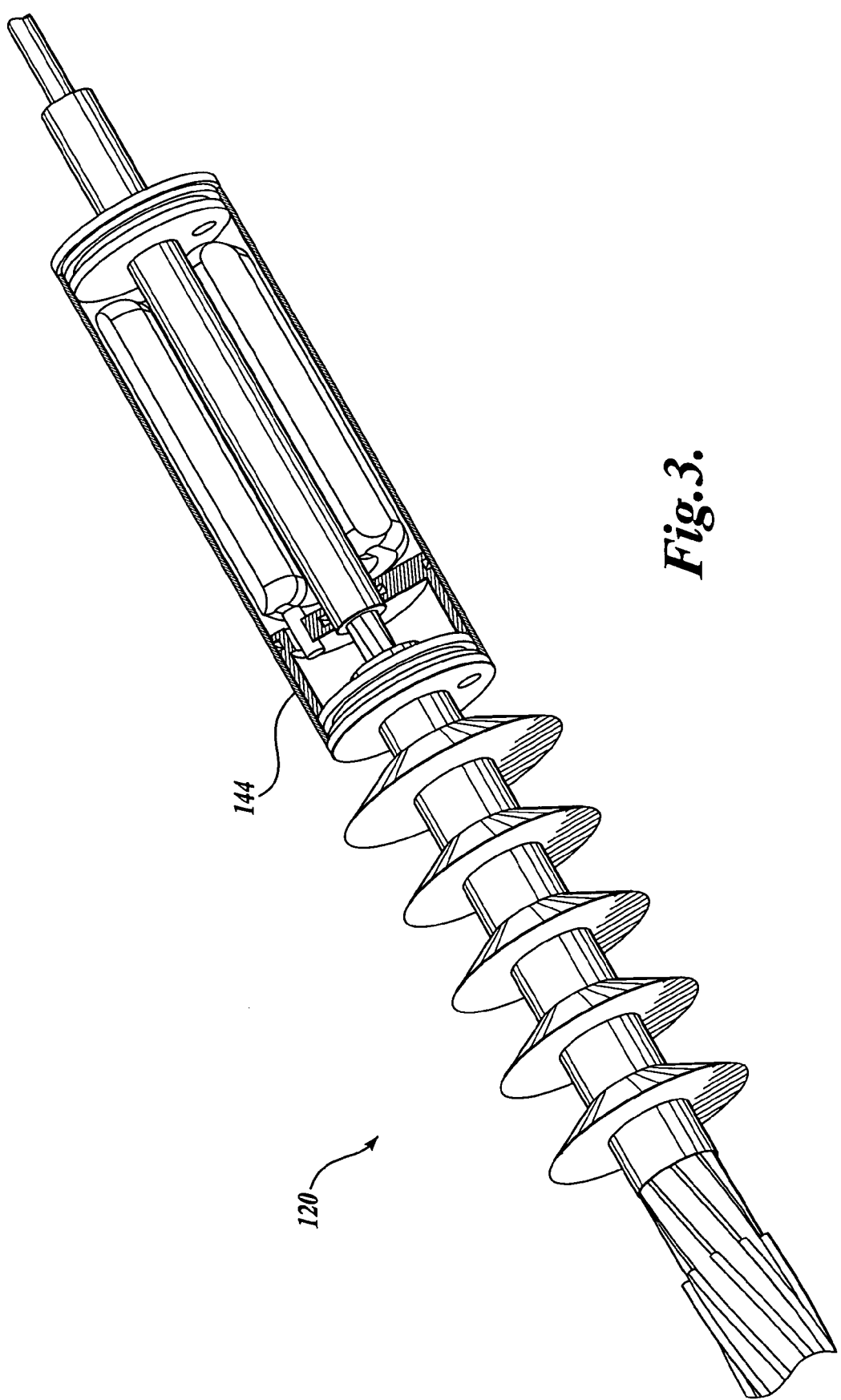
FIG. 3 is an isometric, partial cross-sectional view of a canister of FIG. 1 shown in a live front seal configuration.

FIG. 3 is another exemplary embodiment of the electrical connector 120 formed in accordance with aspects of the present invention. The electrical connector 120 shown in FIG. 3 includes a canister 144 that is substantially identical in materials, construction, and operation as the canister 44 of the electrical connector 20 shown in FIG. 1, with the exception that it is incorporated as part of a live front injection adapter housing.

Figure 4:
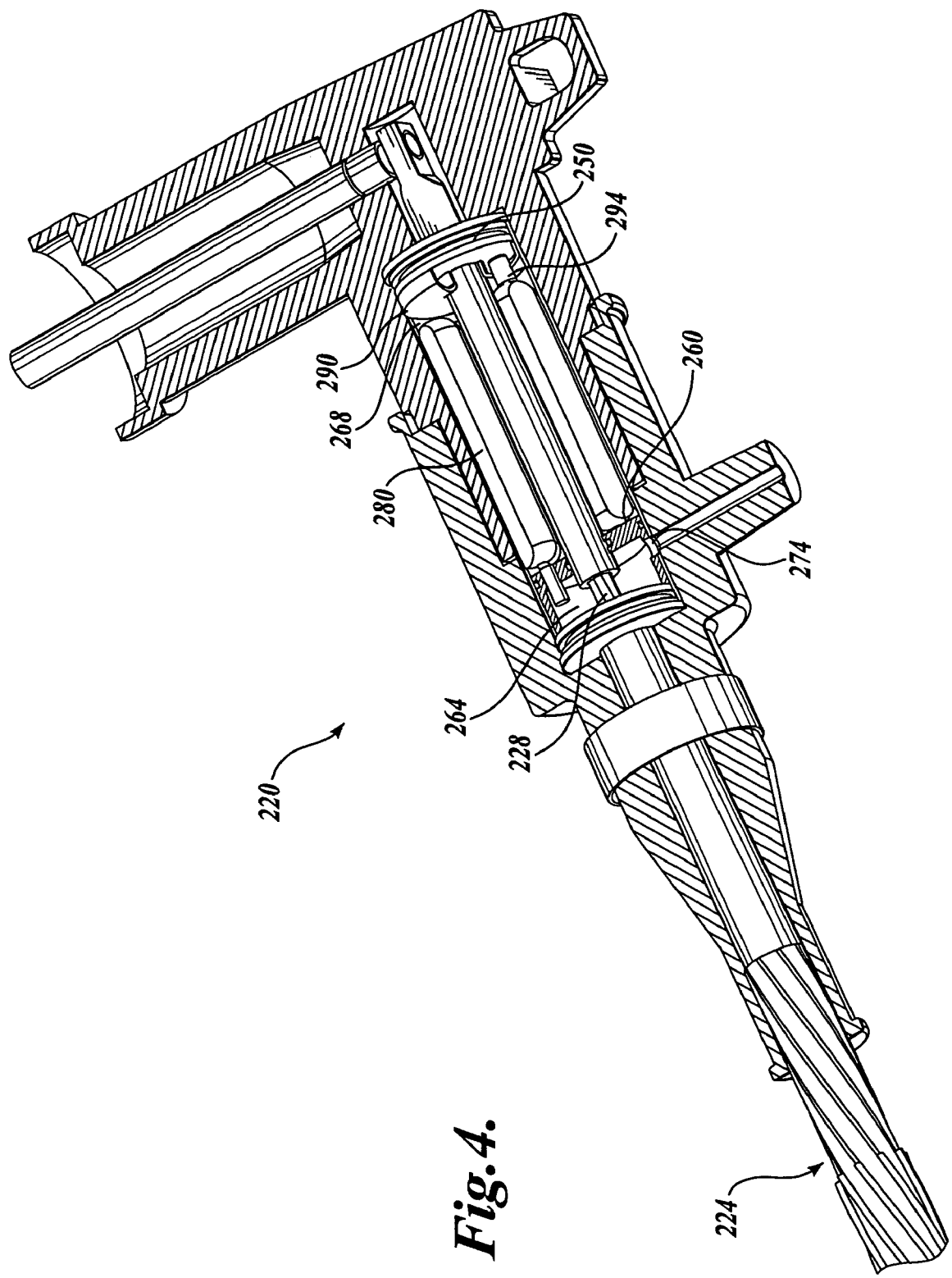
FIG. 4 is an isometric, partial cross-sectional view of an alternate embodiment of the cable connector of FIG. 1, showing the use of a pressure regulator in combination with an enclosed canister.
Figure 5:
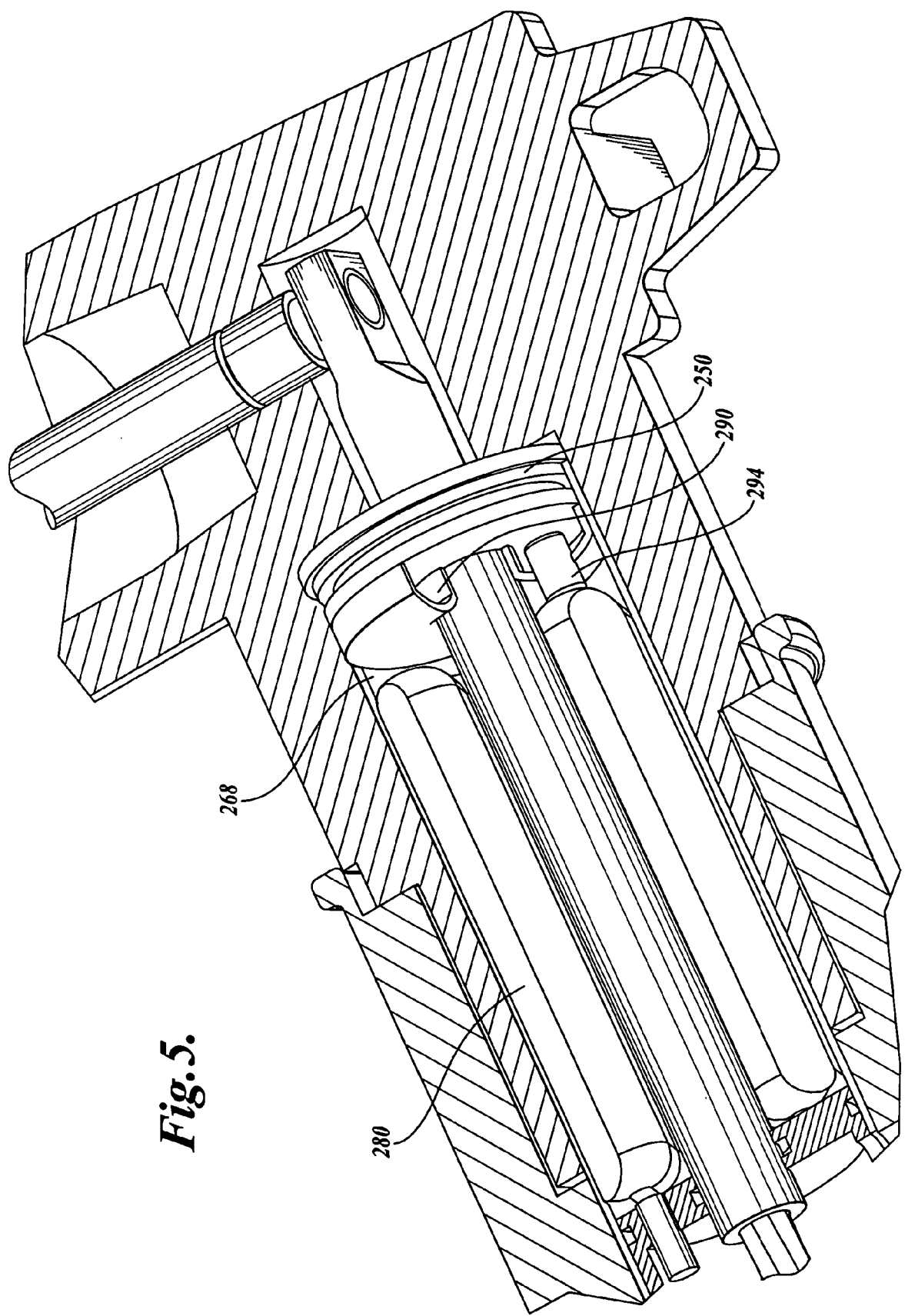
FIG. 5 is a magnified view of the pressure regulator of FIG. 3.

FIGS. 4 and 5 illustrate another exemplary embodiment of an electrical connector 220 constructed in accordance with aspects of the present invention. The electrical connector 220 is substantially similar in material, construction, and operation as the electrical connector 20 of FIG. 1, except for the differences that will now be described. In this embodiment, a third chamber 290 is provided. The third chamber 290 may contain compressed gas at an intermediate pressure that is regulated as it passes into the actuator chamber through a device 294, such as a well-known pressure regulator. In the embodiment shown in FIGS. 4 and 5, the third chamber 290 is formed in the second end section 250 and is supplied with compressed gas by the actuator chamber access port (not shown) disposed in the second end section 250.

The ability to regulate the pressure in the actuator chamber may be used in applications where it is desirable to maintain at least a substantially constant pressure within the canister. Such applications include situations where remediation fluid is injected in a hilly or undulating environment. In some non-hilly environments, the pressure regulator is also desirable and useable where the operator desires to apply a constant pressure against the bladder. It should be apparent to one of ordinary skill in the art that a pressure regulator may be used in conjunction with each and every embodiment described herein, including the live front terminations. Therefore, such embodiments are also within the scope of the present invention.

Figure 6:
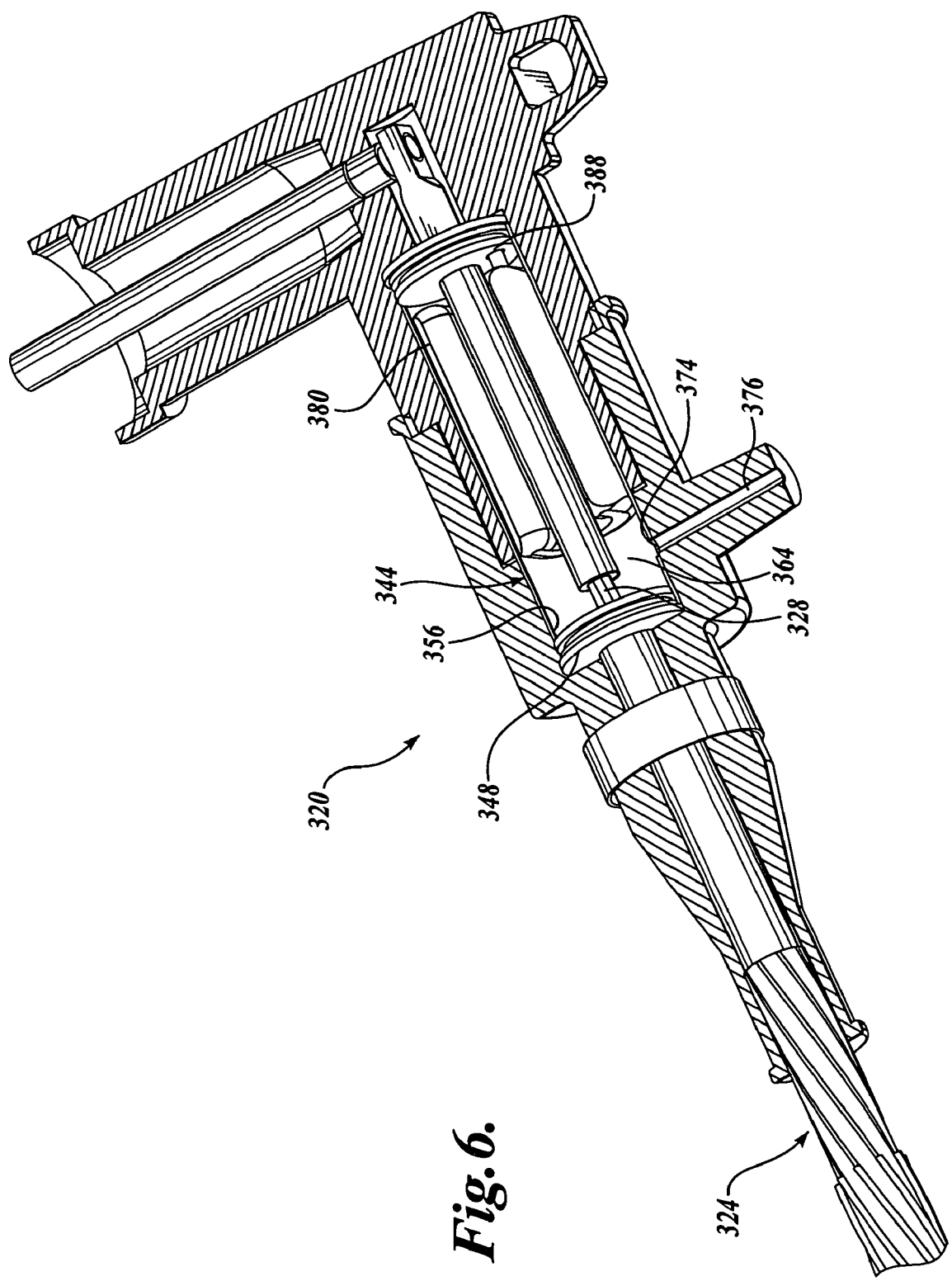
FIG. 6 is an isometric, partial cross-sectional view of a cable connector constructed in accordance with another embodiment of the present invention.

FIG. 6 is another exemplary embodiment of an electrical connector 320 constructed in accordance with aspects of the present invention. The electrical connector 320 is substantially similar in material, construction, and operation as the electrical connector 20 of FIG. 1, except for the differences that will now be described. In this embodiment, the canister 344 creates an internal cavity 356 that is substantially isolated from the environment by a system of seals, the adapter is omitted, and the bladder 380 is connected in fluid communication with the actuator chamber access port 388. The bladder 380 is positioned in the canister such that it creates a fluid chamber 364 between the first end section 348 of the canister and the bladder 380. As such, the fluid chamber 364 surrounds the exposed conductor core 328 of the cable or cable section 324.

Remediation fluid enters the fluid chamber 364 through the fluid chamber access port 374 and outer housing passageway 376. The internal chamber (not shown) defined by the bladder 380 functions as the actuator chamber and may be filled with compressed gas via the actuator chamber access port 388 in several embodiments. In use, the gas filled bladder 380 exerts a force on the surrounding remediation fluid, thereby pushing the remediation fluid into the cable or cable section 324. In this embodiment, the bladder 380 collapses when remediation fluid is deposited into the fluid chamber 364.

Figure 7:
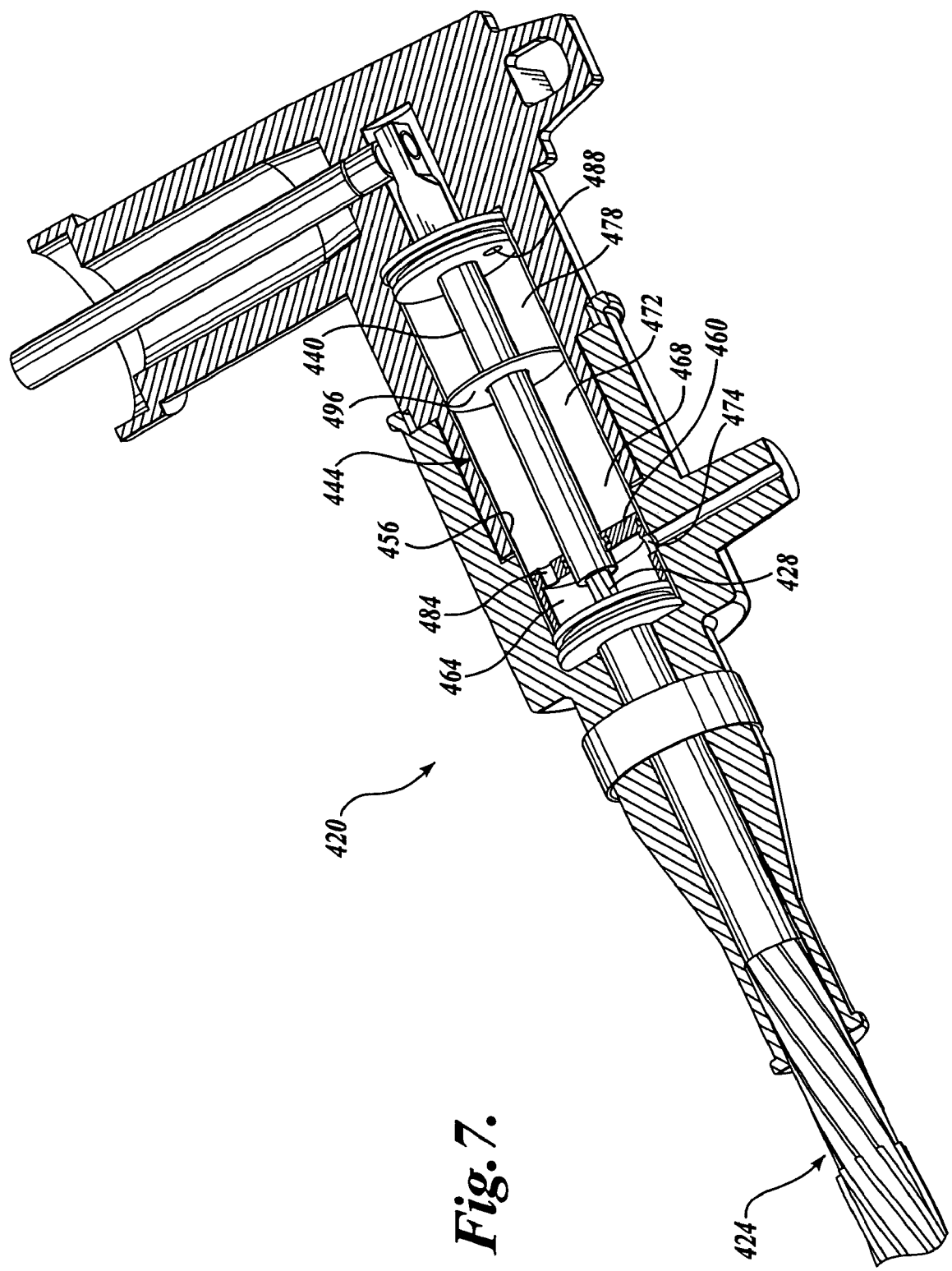
FIG. 7 is an isometric, partial cross-sectional view of a cable connector constructed in accordance with another embodiment of the present invention.

FIG. 7 is another exemplary embodiment of an electrical connector 420 constructed in accordance with aspects of the present invention. The electrical connector 420 is substantially similar in material, construction, and operation as the electrical connector 20 of FIG. 1, except for the differences that will now be described. In this embodiment, the canister 444 creates an interior cavity 456 that is substantially isolated from the environment by a system of seals, and the bladder is replaced by a movable diaphragm 496 that is placed concentrically around the cable coupling 440.

The diaphragm 496 divides the second chamber 468 into two isolated chambers, a remediation fluid storage chamber 472 (also referred to as the auxiliary chamber) and an actuator chamber 478. Remediation fluid may be introduced to the fluid storage chamber 472 through the fluid chamber access port 474, fluid chamber 464 and passageway 484. The diaphragm 496 is constructed from such a material that allows it to float on the surface of the remediation fluid. In one embodiment, compressed gas may be introduced to the actuator chamber 478 through the actuator chamber access port 488. The compressed gas applies pressure against the diaphragm 496, which in turn, applies pressure against the remediation fluid in the fluid storage chamber 472 and the fluid chamber 464 for driving the fluid into the cable or cable section 424. As the remediation fluid is driven into the cable, the diaphragm 496 comes to rest on the adapter 460 and blocks the fluid pathway.

While the preferred embodiment utilizes compressed gas as the actuator, polymeric bushings, compression springs or the like could be used to pressurize the remediation fluid by applying force against the diaphragm.

Figure 8:
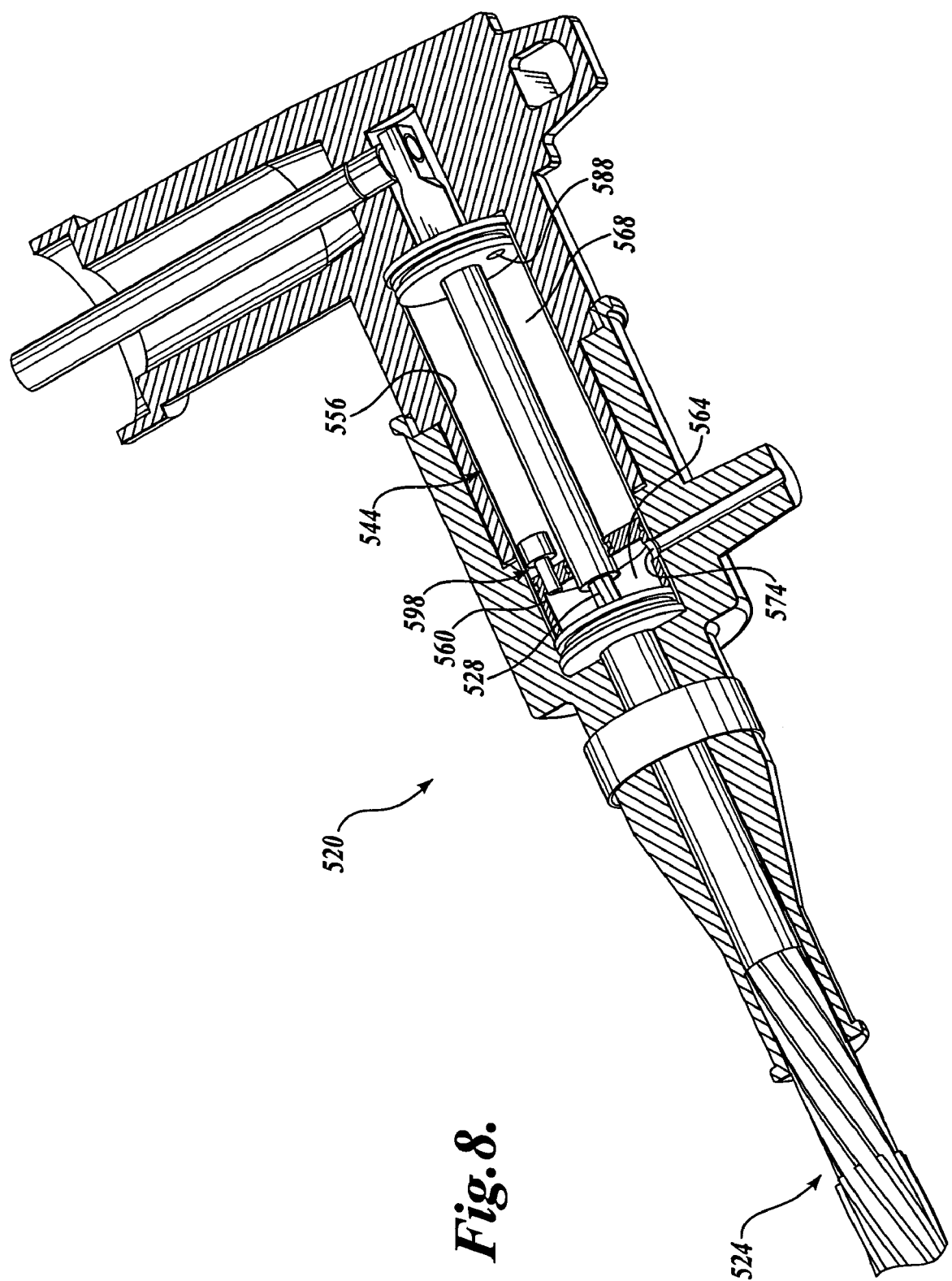
FIG. 8 is an isometric, partial cross-sectional view of a cable connector formed in accordance with another embodiment of the present invention.

FIG. 8 illustrates another exemplary embodiment of an electrical connector 520 constructed in accordance with aspects of the present invention. The electrical connector 520 is substantially similar in material, construction, and operation as the electrical connector 20 of FIG. 1, except for the differences that will now be described. In this embodiment, the canister 544 creates an interior cavity 556 that is substantially isolated from the environment by a system of seals, the adapter 560 is situated in the canister 544 creating a fluid chamber 564 surrounding the cable core 528 and a second chamber 568 isolated from the rest of the interior cavity 556. The bladder in this embodiment is omitted. A valve 598 is included (seen best in FIG. 8), which interconnects the fluid chamber 564 with the second chamber 568.

In use, remediation fluid partially fills the second chamber 568 by filling the fluid chamber 564 via the fluid chamber access port 574. In one embodiment, compressed gas is introduced to the second chamber 568 through the actuator chamber access port 588. The near upright orientation of the termination allows the remediation fluid contained within the second chamber 568 to stay in contact with the valve 598. The valve 598 permits remediation fluid to pass into the fluid chamber 564 and into the cable core 528 but prevents the passage of compressed gas. The valve 598 could be a float valve, a pinch valve, a check valve normally closed, or some other type of valve that closes when the fluid level inside of the second chamber 568 nears empty.

Figure 9:
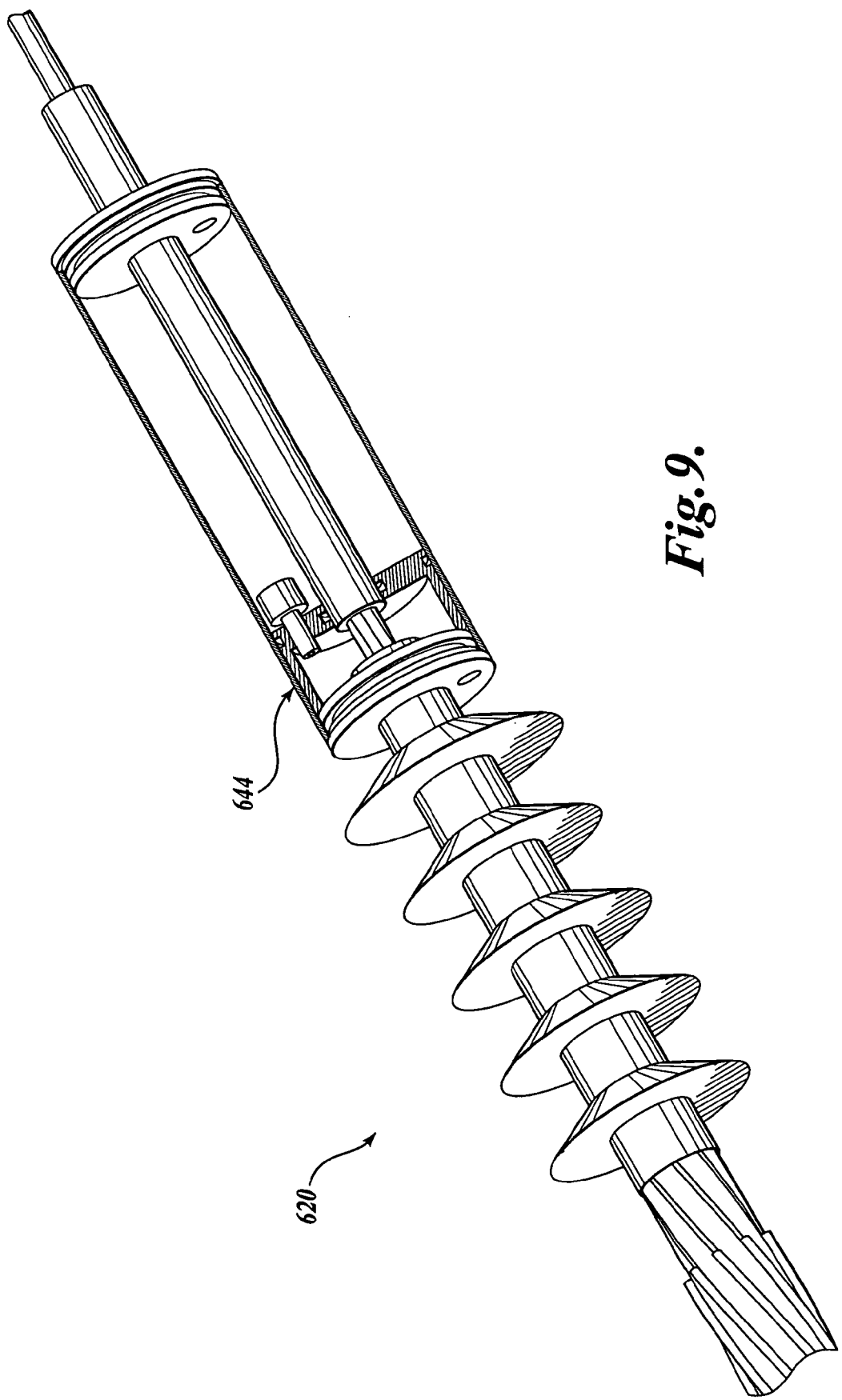
FIG. 9 is an isometric, partial cross-sectional view of a canister of FIG. 8, showing the canister as a live front end seal.

FIG. 9 is another exemplary embodiment of an electrical connector 620 formed in accordance with aspects of the present invention. The electrical connector 620 shown in FIG. 9 includes a canister 644 that is substantially identical in materials, construction, and operation as the canister 544 of the electrical connector 520 shown in FIG. 8, with the exception that it is incorporated as part of a live front injection adapter housing.

Figure 10:
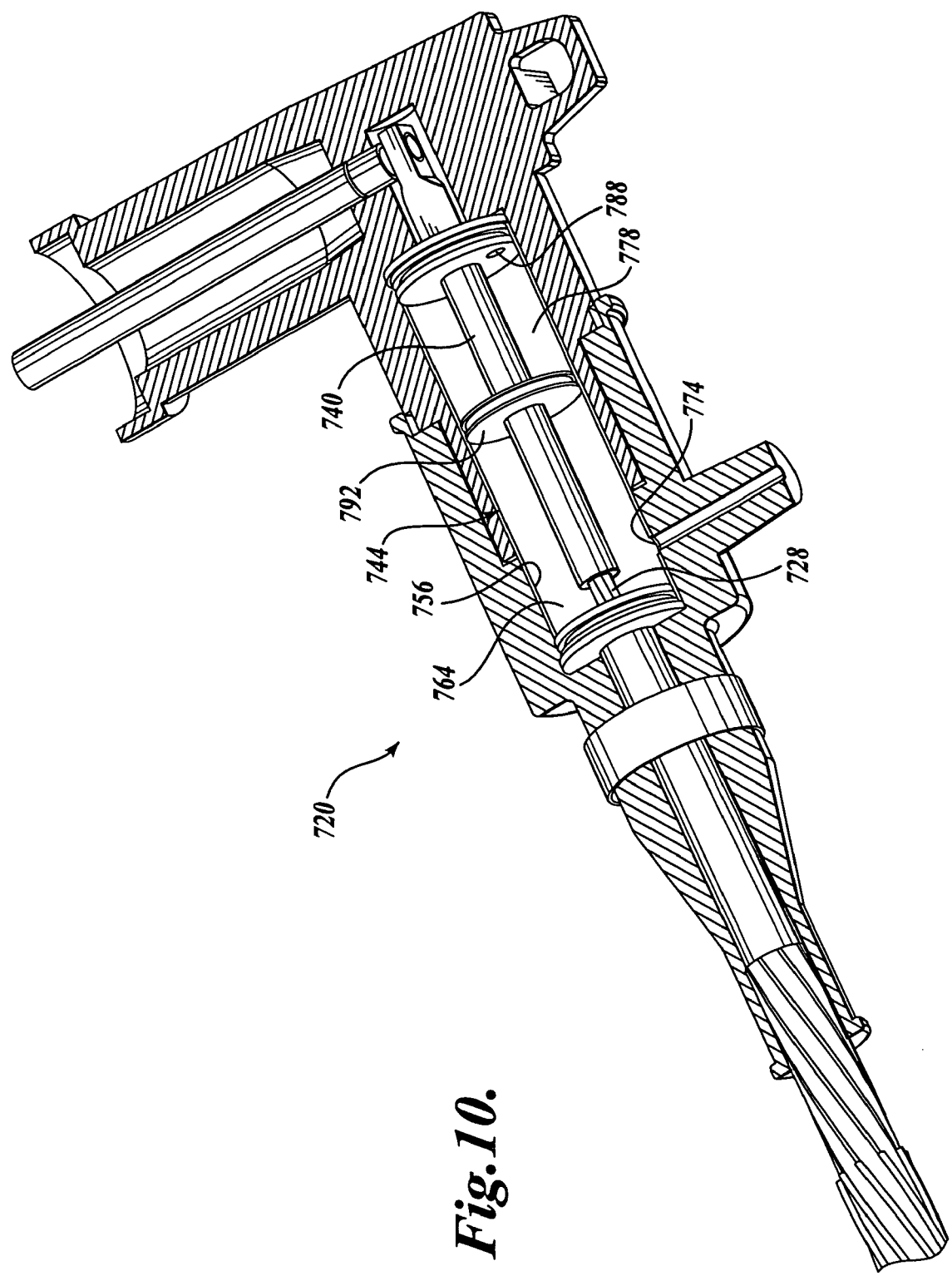
FIG. 10 is an isometric, partial cross-sectional view of a cable connector formed in accordance with another embodiment of the present invention.

FIG. 10 is another embodiment of an electrical connector 720 constructed in accordance with aspects of the present invention. The electrical connector 720 is substantially similar in material, construction, and operation as the electrical connector 20 of FIG. 1, except for the differences that will now be described. In this embodiment, the canister 744 creates an interior cavity 756 that is substantially isolated from the environment by a system of seals. The adapter and the bladder are omitted in this embodiment. A piston 792, constructed from a substantially rigid material is placed concentrically around the cable coupling 740. The piston 792 is permitted to move longitudinally along the length of the canister 744 and divides the canister 744 into two chambers, the fluid chamber 764 and the actuator chamber 778. Seals, such as o-rings, circumferentially seals and isolates the fluid chamber 764 and the actuator chamber 778. The fluid chamber access port 774 allows remediation fluid to be introduced to the fluid chamber 764. As more fluid is added to the connector 720, the piston 792 moves longitudinally along the cable coupling 740 to increase the overall volume of the fluid chamber 464. In one embodiment, a second access port, such as the actuator chamber access port 788, allows compressed gas to be introduced to the actuator chamber 778. Compression or polymeric springs may alternatively by used to maintain a positive pressure against the piston 792.

Figure 11:
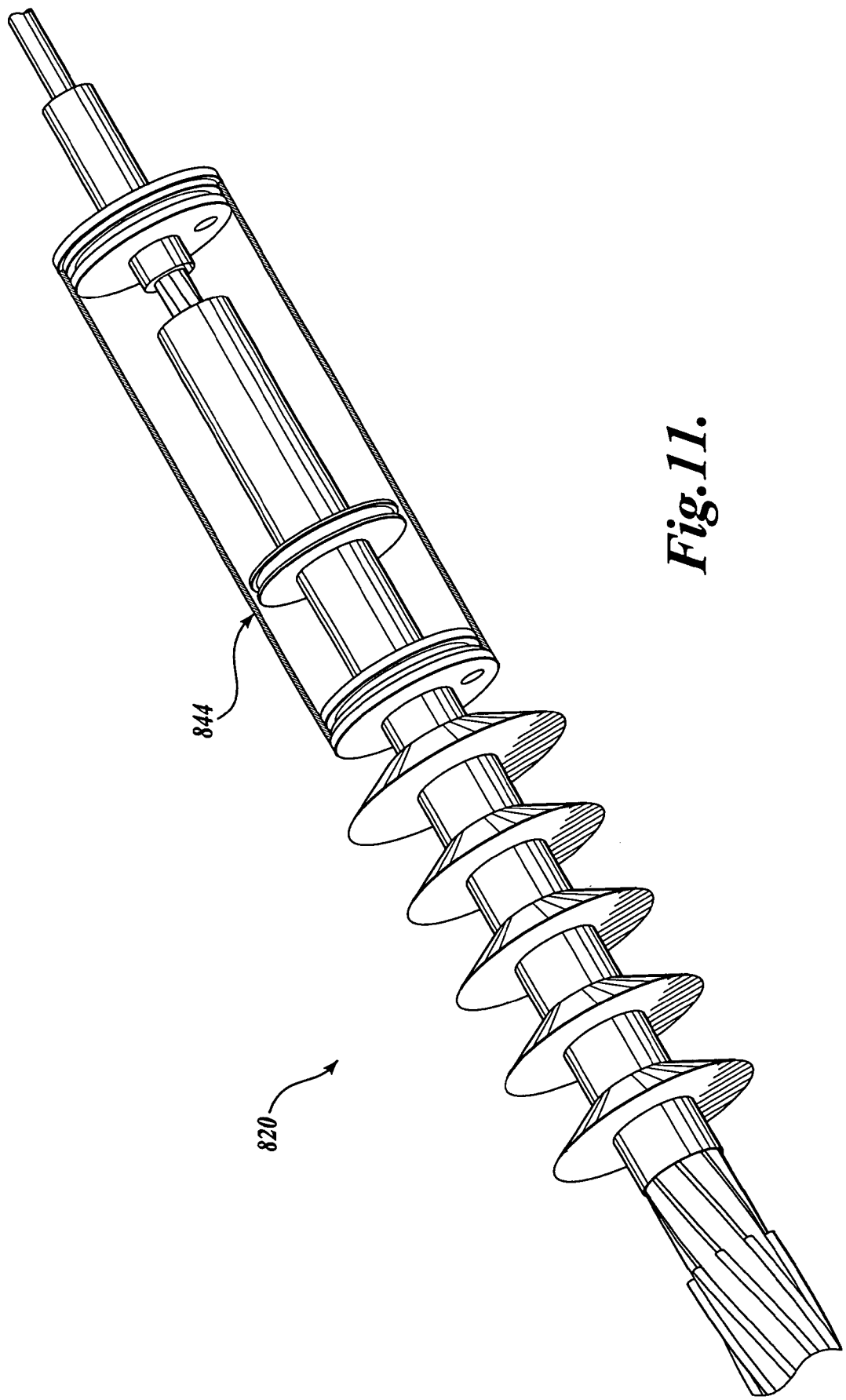
FIG. 11 is an isometric, partial cross-sectional view of a canister of FIG. 10, showing the canister as a live front seal.

FIG. 11 is another exemplary embodiment of the electrical connector 820 formed in accordance with aspects of the present invention. The electrical connector 820 shown in FIG. 11 includes a canister 844 that is substantially identical in materials, construction, and operation as the canister 744 of the electrical connector 720 shown in FIG. 10, with the exception that it is incorporated as part of a live front injection adapter housing.

Figure 12:
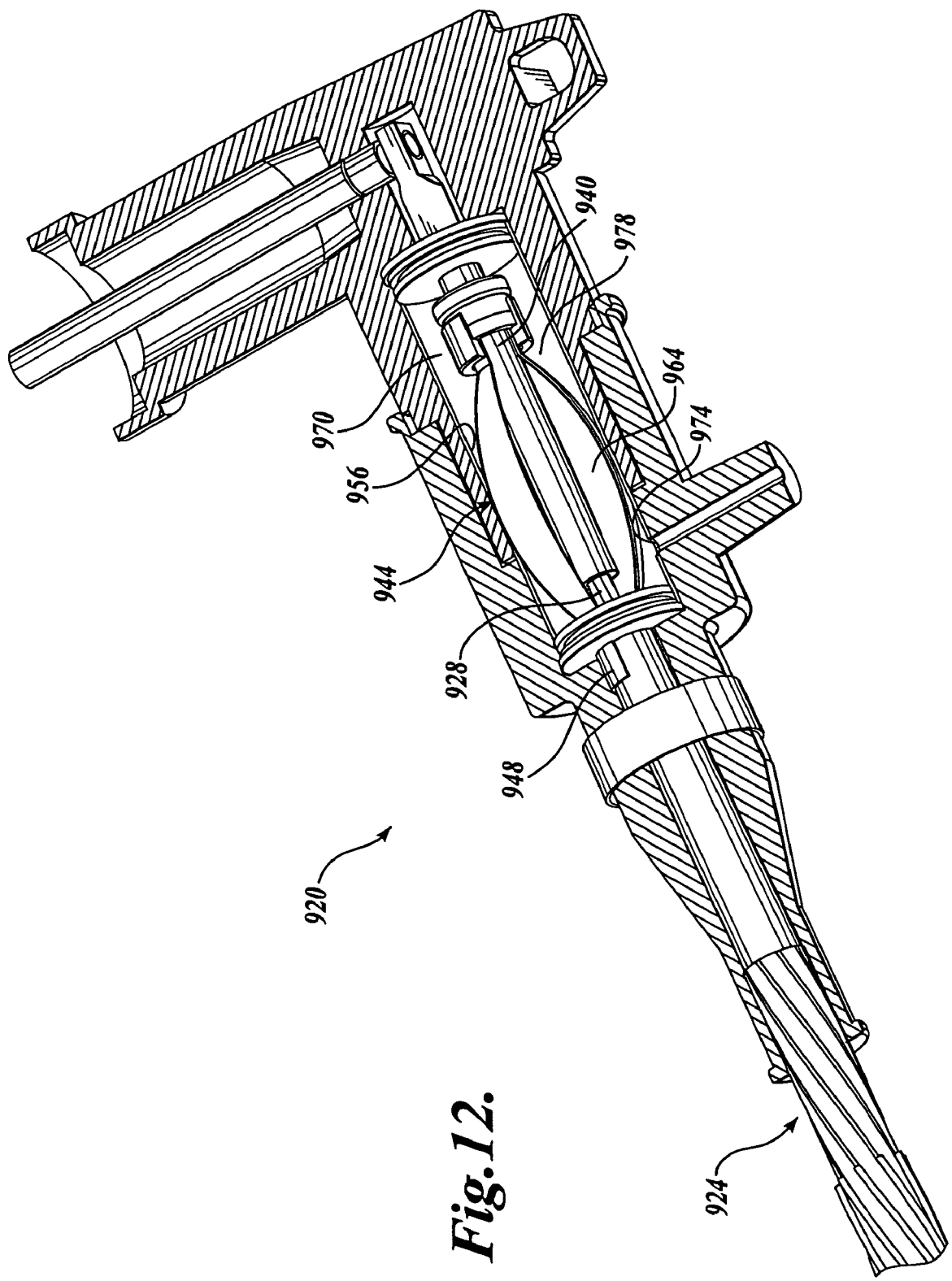
FIG. 12 is an isometric, partial cross-sectional view of a cable connector constructed in accordance with another embodiment of the present invention.

FIG. 12 is another exemplary embodiment of the electrical connector 920 constructed in accordance with aspects of the present invention. The electrical connector 920 is substantially similar in material, construction, and operation as the electrical connector 20 of FIG. 1, except for the differences that will now be described. In this embodiment, the adapter is omitted, and thus, the canister 944 creates a single interior cavity 956 that is substantially isolated from the environment by a system of seals. This embodiment is designed for use in the "non-filling" end of a cable or cable section 924.

A bladder 980, preferably pliable and chemically resistant, is connected and sealed to the first end section 948 and the cable coupling 940, so that a fluid chamber 964 is created around the conductor core 928 of the cable or cable section 924. Compression seals 970 are used to isolate the internals of the bladder 980 from the surroundings. A threaded compression seal, band clamp, hose clamp or other suitable seals could be used. Remediation fluid, introduced to the cable from the second injection termination, enters the described fluid chamber 964 through the exposed cable core 928 and fills the bladder 980 to a selected volume. An access port 974 leads to the actuator chamber 978, which is formed as the area between the bladder 980 and the canister 944 walls. In one embodiment, the actuator chamber 978 can be pressurized with compressed gas introduced through the access port 974, which applies a pressure to the bladder 980 and drives the remediation fluid into the conductor core 928.

A third chamber could be added to the design (not pictured) that is used as a charge device, containing compressed gas at an intermediate pressure. A pressure regulator joins the charge chamber to the actuator chamber allowing a constant pressure to be maintained in the actuator chamber.

Figure 13:
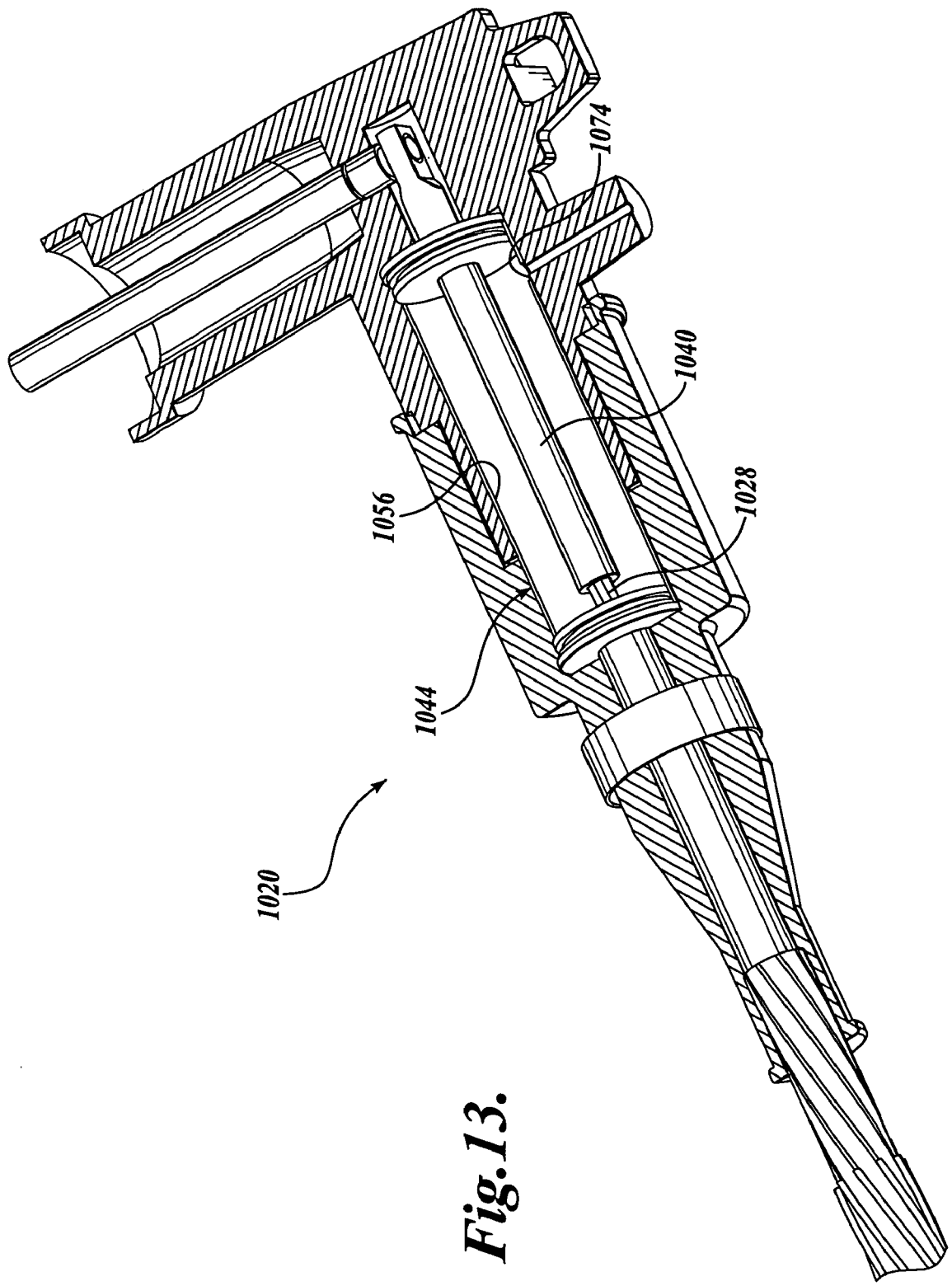
FIG. 13 is an isometric, partial cross-sectional view of a cable connector formed in accordance with another embodiment of the present invention.

FIG. 13 is another exemplary embodiment of the electrical connector 1020 constructed in accordance with aspects of the present invention. The electrical connector 1020 is substantially similar in material, construction, and operation as the electrical connector 20 of FIG. 1, except for the differences that will now be described. In this embodiment, the adapter and bladder are omitted, and thus, the canister 1044 creates a single interior fluid cavity 1056 that is substantially isolated from the environment by a system of seals. The fluid cavity, in use, acts as both a fluid chamber and an actuator chamber. An access port 1074 allows controlled entry to the internal fluid/actuator chamber. Controlled entry may be effected by well known valves and the like. In one embodiment, the remainder of the canister's volume is filled with compressed gas via a fluid access port 1074 that applies a pressure to the remediation fluid and drives it into the conductor core 1028. The higher density of the remediation fluid compared to the compressed gas actuator ensures that the remediation fluid will be travel into the cable prior to the gas of the actuator.

Figure 14:
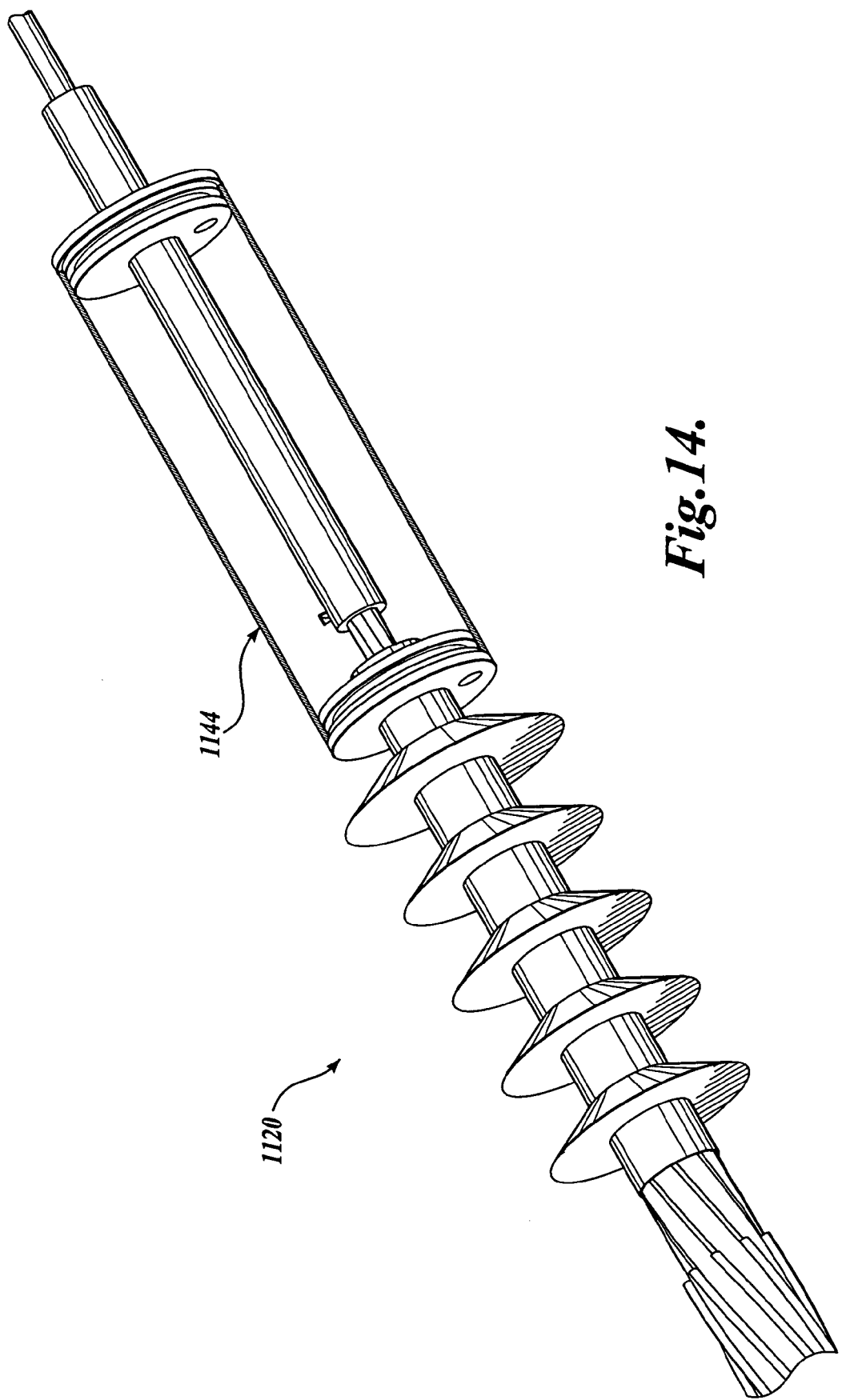
FIG. 14 is an isometric, partial cross-sectional view of a canister of FIG. 13, showing the canister in use with a live front seal.

FIG. 14 is another exemplary embodiment of the electrical connector 1120 formed in accordance with aspects of the present invention. The electrical connector 1120 shown in FIG. 14 includes a canister 1144 that is substantially identical in materials, construction, and operation as the canister 1044 of the electrical connector 1020 shown in FIG. 13, with the exception that it is incorporated as part of a live front injection adapter housing.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A cable connector for introducing fluid to a cable affixed in a primary chamber internal to the cable connector, the cable connector comprising:
   an injection port exposed to at least one exterior surface of the cable connector, the injection port connected in fluid communication with the primary chamber internal to the cable connector; and
   an auxiliary chamber internal to the cable connector, the auxiliary chamber connected in fluid communication with the primary chamber.

2. The cable connector of claim 1, wherein fluid occupying the auxiliary chamber fills the primary chamber by the effects of gravity during use.

3. The cable connector of claim 1, wherein the auxiliary chamber is defined by a bladder.

4. The cable connector of claim 1, further comprising an actuator chamber associated with the auxiliary chamber.

5. The cable connector of claim 4, wherein the auxiliary chamber is defined by a bladder.

6. The cable connector of claim 4, wherein the actuator chamber is fluidly isolated from the auxiliary chamber.

7. The cable connector of claim 4, wherein the actuator chamber contains fluid under pressure.

8. The cable connector of claim 1, wherein the auxiliary chamber is exposed to externally applied pressure for driving fluid from the auxiliary chamber into the primary chamber.

9. The cable connector of claim 8, wherein the externally applied pressure is regulated.

10. The cable connector of claim 1, wherein the auxiliary chamber is exposed to internal pressure for driving fluid from the auxiliary chamber into the primary chamber.

11. The cable connector of claim 1, further comprising a valve conditionally placing the auxiliary chamber in fluid communication with the primary chamber.

12. The cable connector of claim 11, wherein the valve is operable to permit passage of liquid in one direction between the auxiliary chamber and the primary chamber.

13. The cable connector of claim 12, wherein the valve is further operable to prohibit passage of gas between the auxiliary chamber and the primary chamber.

14. A cable connector for introducing fluid to a cable affixed in a first chamber internal to the cable connector, the cable connector comprising:
   an injection port exposed to at least one exterior surface of the cable connector, the injection port being connected in fluid communication with the first chamber internal to the cable connector for supplying fluid thereto;
   a second chamber internal to the cable connector, the second chamber connected in fluid communication with the first chamber; and
   means for driving fluid disposed in the first chamber into the cable affixed therein.

15. A cable connector for introducing fluid to a cable affixed in a first chamber internal to the cable connector, the cable connector comprising:
- an injection port exposed to at least one external surface of the cable connector, the injection port connected in fluid communication with the first chamber internal to the cable connector; and
- a second discrete fluid chamber having a variable volume, the second chamber connected in fluid communication with the first chamber.

16. The cable connector of claim 15, further comprising a third chamber fluidly isolated from the first and second chambers, wherein the third chamber applies pressure on fluid disposed in the second chamber for forcing the fluid in the second chamber into the first chamber.

17. The cable connector of claim 15, wherein the variable volume of the second chamber is dependent on operational parameters of the cable connector.

18. A cable connector for introducing fluid to a cable affixed in a first chamber internal to the cable connector, the cable connector comprising:
- an injection port exposed to at least one exterior surface of the cable connector, the injection port being connected in fluid communication with the first chamber internal to the cable connector for supplying fluid thereto; and
- means for driving fluid disposed in the first chamber into the cable affixed therein.

19. A cable connector, comprising:
- a housing including a fluid chamber;
- a cable section disposed within the fluid chamber; and
- pressurized fluid disposed within the fluid chamber.

20. The cable connector of claim 19, further comprising a biasing device for pressurizing the fluid present in the fluid chamber.

21. A cable connector for introducing fluid to a cable affixed in a first chamber internal to the cable connector, the cable connector comprising:
- a second chamber internal to the cable connector, the second chamber fluidly isolated from the primary chamber; and
- a pressure generator disposed in the second chamber, wherein the pressure generator applies pressure against fluid occupying the first chamber.

22. The cable connector of claim 21, further comprising an injection port exposed to at least one exterior surface of the cable connector, the injection port connected in fluid communication with the second chamber.

23. The cable connector of claim 21, wherein the first chamber is defined by a bladder.

24. The cable connector of claim 21, wherein the second chamber is defined by a bladder.

25. The cable connector of claim 21, further comprising a piston separating the first chamber and the second chamber, wherein the piston is movable in the direction of the first chamber upon application of pressure from the second chamber.

26. The cable connector of claim 21, further comprising a diaphragm, wherein the diaphragm is movable in the direction of the first chamber upon application of pressure from the second chamber.

* * * * *